(12) United States Patent
Tsukamoto

(10) Patent No.: US 12,168,496 B2
(45) Date of Patent: Dec. 17, 2024

(54) POWER ASSIST DEVICE FOR BICYCLES, AND BICYCLE

(71) Applicant: HONDA MOTOR CO., LTD., Tokyo (JP)

(72) Inventor: Kenji Tsukamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 552 days.

(21) Appl. No.: 17/610,517

(22) PCT Filed: Jun. 10, 2020

(86) PCT No.: PCT/JP2020/022838
§ 371 (c)(1),
(2) Date: Nov. 11, 2021

(87) PCT Pub. No.: WO2020/250926
PCT Pub. Date: Dec. 17, 2020

(65) Prior Publication Data
US 2022/0212751 A1    Jul. 7, 2022

(30) Foreign Application Priority Data
Jun. 12, 2019 (JP) .................. 2019-109732

(51) Int. Cl.
*B62M 6/50* (2010.01)
*B62M 6/55* (2010.01)

(52) U.S. Cl.
CPC .............. *B62M 6/50* (2013.01); *B62M 6/55* (2013.01)

(58) Field of Classification Search
CPC .................. B62M 6/50; B62M 6/55
See application file for complete search history.

(56) References Cited

U.S. PATENT DOCUMENTS 6,196,347 B1 * 3/2001 Chao ............ G01L 3/1435
180/220

FOREIGN PATENT DOCUMENTS

| CN | 106184587 A | 12/2016 | |
|---|---|---|---|
| EP | 3305609 A1 * | 4/2018 | ............. B60T 13/74 |
| JP | 2007091159 A | 4/2007 | |

OTHER PUBLICATIONS

International Search Report for Patent Application PCT/JP2020/022838 mailed Jul. 14, 2020; 2 pp.

* cited by examiner

*Primary Examiner* — Jacob D Knutson
(74) *Attorney, Agent, or Firm* — ARMSTRONG TEASDALE LLP

(57) ABSTRACT

An electric power assist device for bicycles includes: a dynamic brake controller configured to stop supply of a current from a battery to an electric motor and bring a dynamic brake circuit to an ON state when a crank rotational angle is within one or more predetermined crank rotational angle ranges; a pedaling force estimator configured to estimate a pedaling force put on pedals of a bicycle on a value of reverse current caused by a counter electromotive force and detected by a current sensor when the dynamic brake circuit is in the ON state; and a motor drive controller configured to control the electric motor based on the pedaling force estimated by the pedaling force estimator.

12 Claims, 8 Drawing Sheets

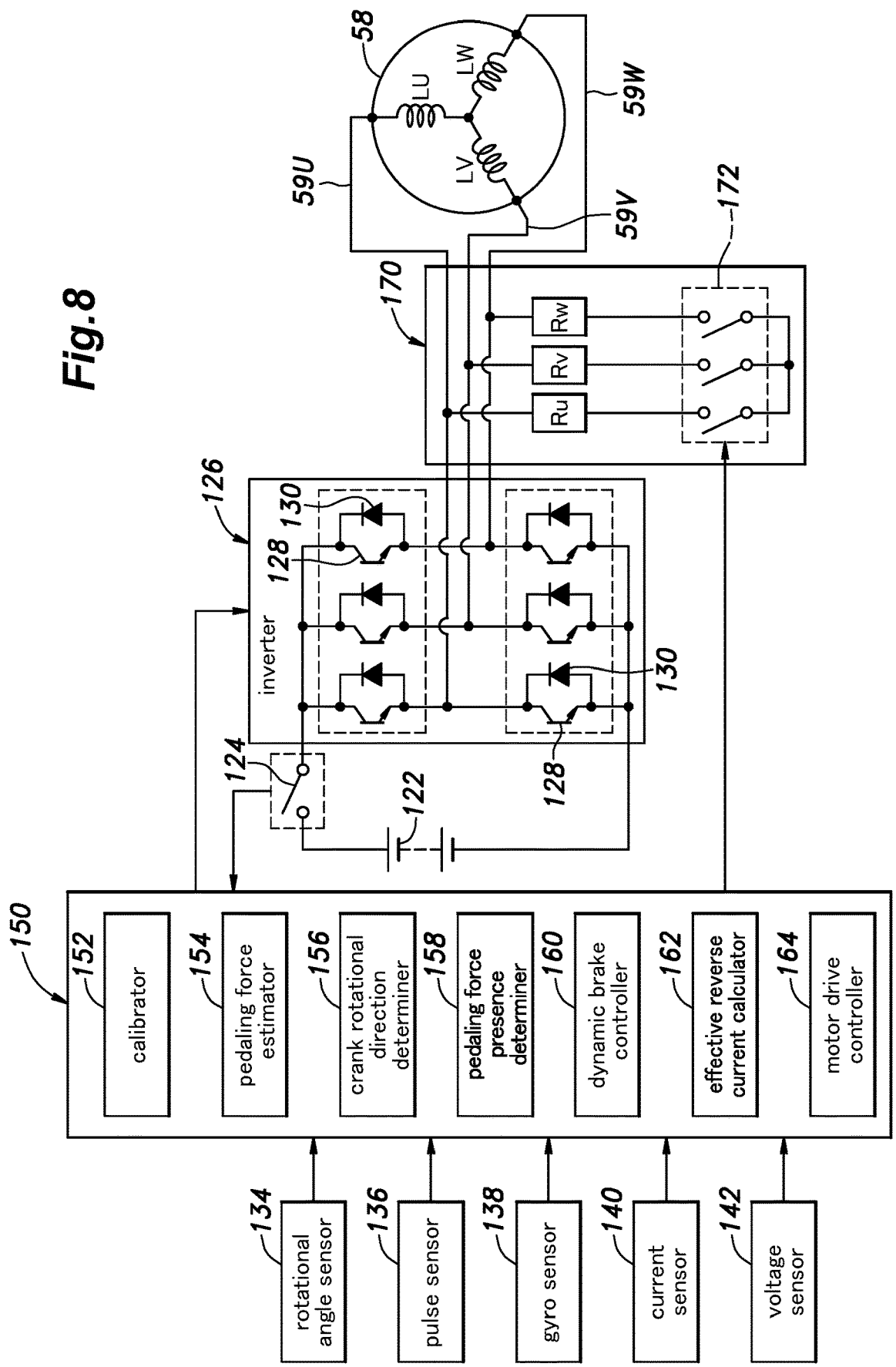

POWER ASSIST DEVICE FOR BICYCLES, AND BICYCLE

CROSS-REFERENCE TO RELATED APPLICATIONS

This application is a U.S. National Phase Application of PCT/JP2020/022838 filed Jun. 10, 2020, which claims the benefit of Japanese Patent Application No. 2019-109732 filed Jun. 12, 2019. The content of these applications is hereby expressly incorporated by reference in their entirety.

TECHNICAL FIELD

The present invention relates to an electric power assist device for bicycles, and a bicycle. In particular, the present invention relates to an electric power assist device for bicycles capable of estimating a pedaling power and controlling an electric motor for generating an assist power based on the estimated pedaling force, and a bicycle fitted with the electric power assist device.

BACKGROUND ART

Known power assisted bicycles include those configured to measure the distortion of a pedal system by using a strain gauge, calculate a pedaling force based on the measured distortion value, and control an electric motor based on the calculated pedaling force (See Patent Document 1), and those configured to detect a pedaling force by using a pedaling force sensor, the sensor including a pedaling force transmitting sleeve attached to a crankshaft driven by the pedal, and control an electric motor based on the detected pedaling force (See Patent Document 2).

PRIOR ART DOCUMENT(S)

Patent Document(s)

Patent Document 1: JP2007-09115
Patent Document 2: U.S. Pat. No. 6,196,347B1

SUMMARY OF THE INVENTION

Task to be Accomplished by the Invention

Known technologies for power assisted bicycles as described above inconveniently involve complicated features for detecting a pedaling force. In particular, in order to use such technologies with existing bicycles, some modifications need to be made to the bicycles, which can be obstacles to conversion of existing bicycles to power assisted ones by attaching electric power assist devices to them.

The present invention has been made in view of the problem of the prior art, and a primary object of the present invention is to provide an electric power assist device for bicycles, which enables proper power assist control in response to a pedaling force without any complicated feature for detecting pedaling force and any necessary modification to the bicycle.

Means to Accomplish the Task

An aspect of the present invention provides an electric power-assist device for bicycles, the device comprising: a crankshaft (24) configured to be driven by a pedaling force transmitted from a pedal (30) via a crankarm (26, 28) on each side; an electric motor connected to the crankshaft or the crankarm of a bicycle in a torque transmitting relationship; a battery (122) which is provided in the bicycle (10) and serves as a power source for the electric motor; a housing (52) which can be attached to a frame structure (18) of the bicycle, wherein the electric motor is provided in the housing; a rotating member (64) rotatably supported by the housing, rotationally driven by the electric motor, and connected to the crankshaft or the crankarm of the bicycle in a torque transmitting relationship; and a control unit (150) for controlling operation of the electric motor, wherein the electric power assist device further comprises: a dynamic brake circuit (126, 170) connected to the electric motor; a rotational angle sensor (134) configured to detect a crank rotational angle of the crankshaft; and a current sensor (140) configured to detect a value of motor current supplied to the electric motor, wherein the control unit comprises: a dynamic brake controller (160) configured to stop supply of current from the battery to the electric motor and bring the dynamic brake circuit to an ON state when the crank rotational angle is within one or more predetermined crank rotational angle ranges; a pedaling force estimator (154) configured to estimate a pedaling force put on each pedal of the bicycle based on a value of reverse current caused by a counter electromotive force and detected by the current sensor when the dynamic brake circuit is in the ON state; and a motor drive controller (164) configured to control the electric motor based on the pedaling force estimated by the pedaling force estimator.

This configuration enables proper power assist control in response to a pedaling force without any complicated feature for detecting pedaling force and any necessary modification to the bicycle.

In this electric power assist device, preferably, the pedaling force estimator estimates the pedaling force to be greater with an increasing value of reverse current.

In this configuration, the estimation of pedaling force can be properly performed.

In this electric power assist device, preferably, the pedaling force estimator determines the pedaling force based on a value of effective reverse current, the value of effective reverse current being calculated by subtracting a value of reverse current caused by inertial rotation of the crankshaft from the value of reverse current caused by the counter electromotive force, when the dynamic brake circuit is in the ON state.

This configuration enables the accurate estimation of pedaling force.

In this electric power assist device, preferably, the motor drive controller causes the electric motor to stop operation when the value of effective reverse current is a negative value.

This configuration prevents the electric power assist device from performing unnecessary power assist when the bicycle is coasting with no pedaling.

In this electric power assist device, preferably, the dynamic brake controller brings the dynamic brake circuit to the ON state when the crank rotational angle of the crankshaft is within the one or more predetermined crank rotational angle ranges, wherein the one or more predetermined crank rotational angle ranges include (i) a crank rotational angle range including a crank rotational angle of 90 degrees from a reference crank rotational angle, the reference crank rotational angle being a crank rotational angle when the pedal of a crankarm on one side is located at its highest position, and/or (ii) a crank rotational angle range including a crank rotational angle of 270 degrees from the reference crank rotational angle.

In this configuration, the estimation of pedaling force can be properly performed based on a value of reverse current caused by a counter electromotive force.

In this electric power assist device, preferably, when the electric power-assist device is power-off, the dynamic brake controller brings the dynamic brake circuit to an always-ON state, and, after the electric power-assist device is turned on again, the dynamic brake controller brings the dynamic brake circuit to the ON state only when the crank rotational angle is within the one or more predetermined crank rotational angle ranges.

In this configuration, even though the dynamic brake circuit is in an always-ON state when the electric power-assist device is power-off, after the electric power-assist device is turned on again, the dynamic brake circuit returns to a normal state in which the dynamic brake circuit is in the ON state only when the crank rotational angle is within the predetermined crank rotational angle range(s).

In this electric power assist device, preferably, when the electric power-assist device is power-off, the dynamic brake controller brings the dynamic brake circuit to an always-ON state, and, after the electric power-assist device is turned on again and the crankshaft is manually rotated to preset crank rotational angles in a certain sequence, the dynamic brake controller brings the dynamic brake circuit to the ON state only when the crank rotational angle is within the predetermined crank rotational angle range(s).

In this configuration, the dynamic brake circuit can be in the always-ON state, making the bicycle harder to pedal, which serves as a theft-prevention measure.

In this electric power assist device, preferably, the electric power assist device further comprises a crank rotational direction determiner configured to determine whether the crankshaft is rotating in a forward direction or in a reverse direction based on crank rotational angles detected by the rotational angle sensor, wherein the motor drive controller causes the electric motor to stop operation when the rotational direction determiner determines that the crankshaft is rotating in the reverse direction.

This configuration prevents the electric power assist device from performing unnecessary power assist when the crankshaft rotates in the reverse direction.

In this electric power assist device, preferably, the electric power assist device further comprises a rotational movement sensor (136) configured to detect rotational movement of the crankshaft; and a pedaling force presence determiner (158) configured to determine whether or not a pedaling force is put on each pedal from the rotational movement of the crankshaft detected by the rotational movement sensor, wherein the motor drive controller causes the electric motor to stop operation when the pedaling force presence determiner determines that no pedaling force is put on the pedals.

This configuration prevents the electric power assist device from performing unnecessary power assist when there is no pedaling force on the pedal.

In this electric power assist device, preferably, the electric power assist device further comprises a gyro sensor (138) for detecting a tilt angle of the bicycle with respect to a direction of gravity, wherein the motor drive controller corrects a rotational output of the electric motor based on the tilt angle detected by the gyro sensor.

This configuration enables the power assist to be performed as needed by the rider, and improves the safety.

In this electric power assist device, preferably, the electric power assist device further comprises a voltage sensor (140) for detecting a voltage of the battery, wherein the motor drive controller reduces a rotational output of the electric motor in response to a voltage drop detected by the voltage sensor.

This configuration prevents over-discharging of the battery.

Another aspect of the present invention provides a bicycle fitted with the above-described electric power assist device.

This configuration enables proper power assist control in response to a pedaling force without any complicated feature for detecting pedaling force and any necessary modification to the bicycle.

Effect of the Invention

In an electric power assist device and a bicycle according to the present invention, proper power assist control in response to a pedaling force can be performed without any complicated feature for detecting pedaling force and any necessary modification to the bicycle.

BRIEF DESCRIPTION OF THE DRAWINGS

FIG. 8 is a block diagram of a power assist control system for the electric power assist device according to a second embodiment of the present invention.

DESCRIPTION OF THE PREFERRED EMBODIMENT(S)

An electric power assist device and a bicycle according to a first embodiment of the present invention will be described with reference to FIGS. 1 to 6.

Figure 1:
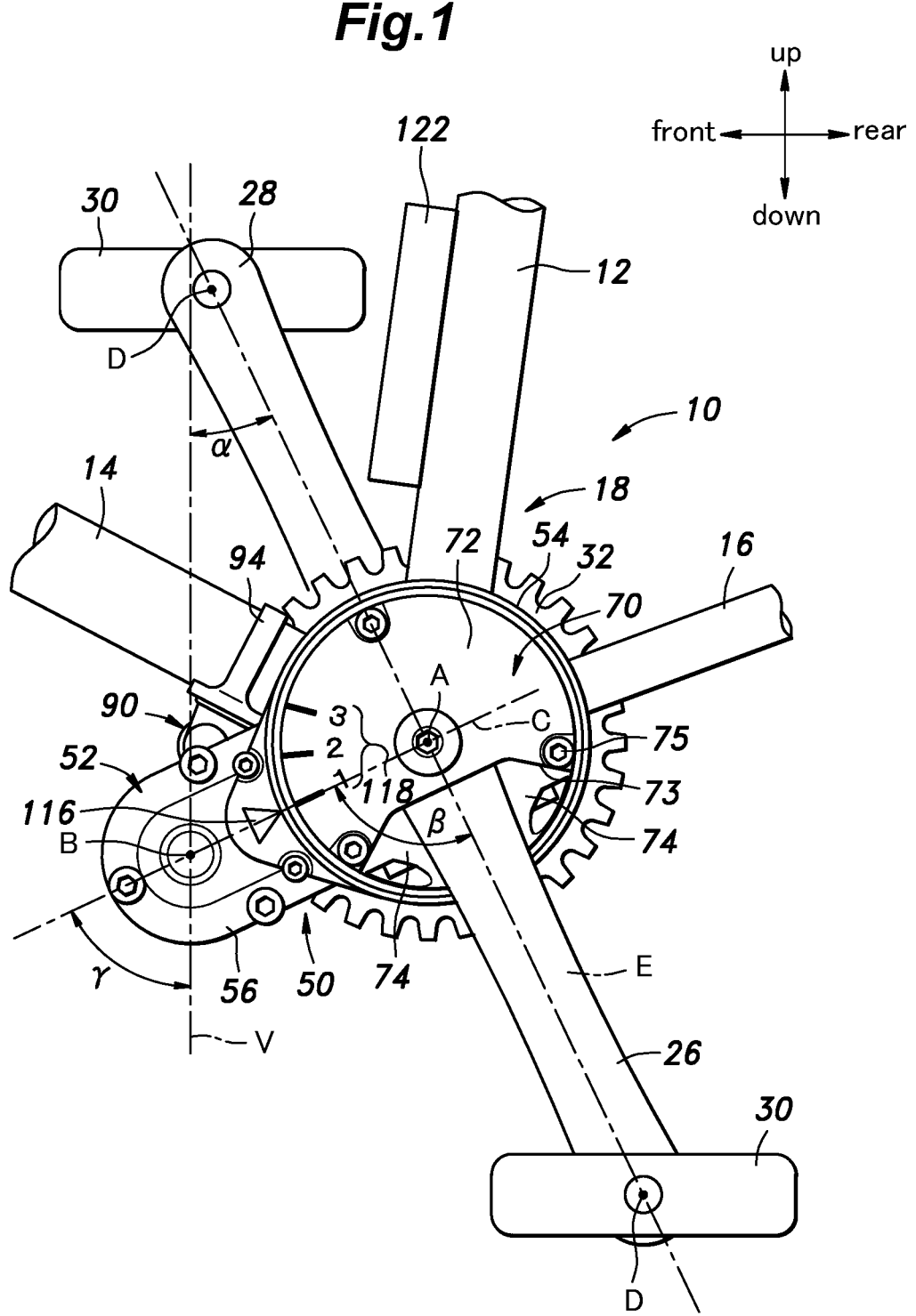
FIG. 1 is a side view of an electric power assist device according to a first embodiment of the present invention and a bicycle fitted with the electric power assist device.
Figure 2:
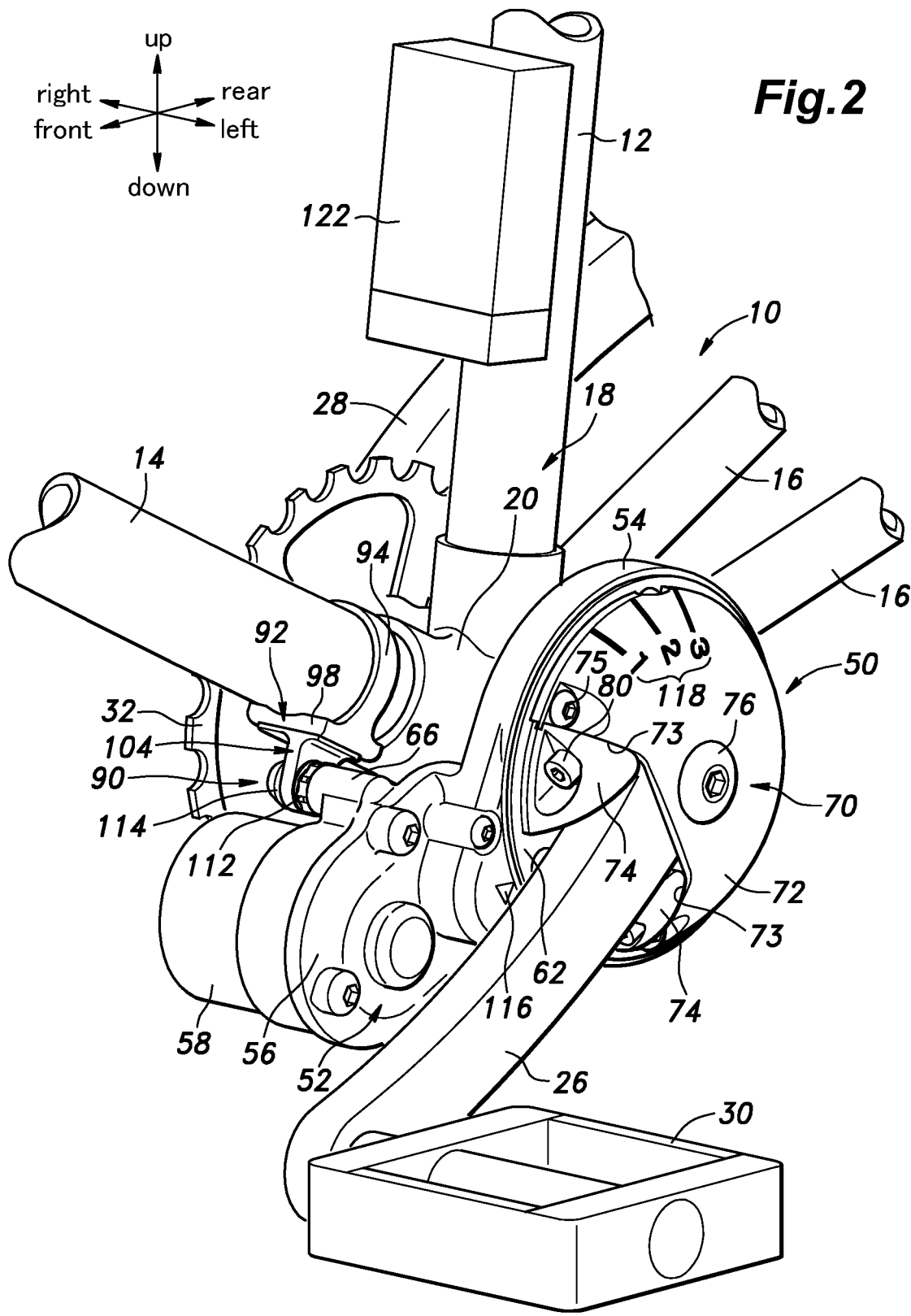
FIG. 2 is a fragmentary perspective view of the electric power assist device and the bicycle of the first embodiment.
Figure 3:
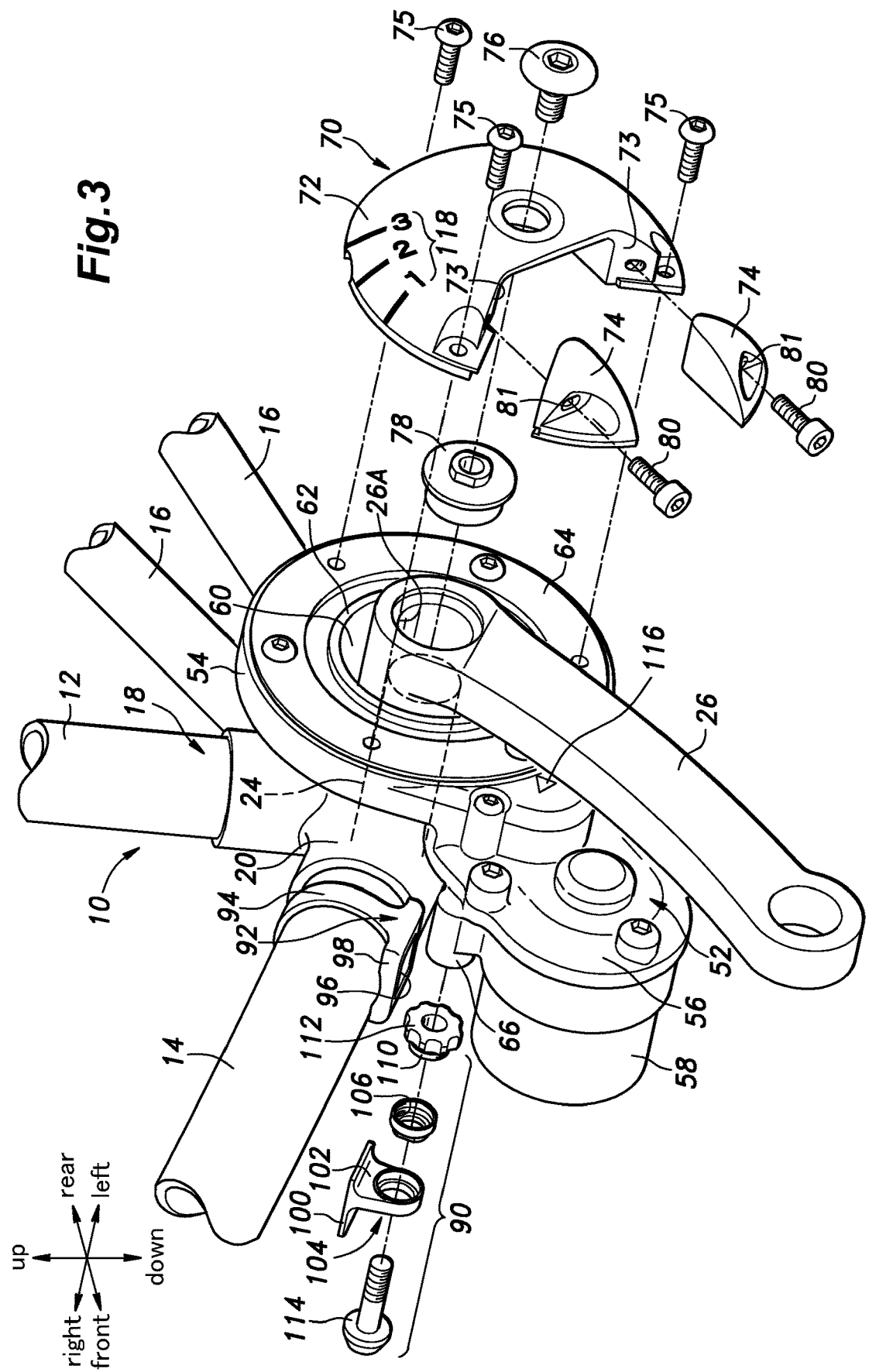
FIG. 3 is a fragmentary exploded perspective view of the electric power assist device and the bicycle of the first embodiment.

As shown in FIGS. 1 to 3, a bicycle 10 is provided with a frame structure 18 that includes a seat tube 12 extending substantially in the vertical direction and having a saddle (not shown) attached to the upper end thereof, a down tube 14 extending substantially in the fore and aft direction, and left and right chain stays 16. The lower end of the seat tube 12, the rear end of the down tube 14, and the front ends of the chain stays 16 are connected to one another by a bearing tube 20 for supporting a crankshaft and also serving as a pipe joint.

The bearing tube 20 rotatably supports a crankshaft 24 (see FIG. 3) extending substantially horizontally in the lateral direction. The left and right shaft ends of the crankshaft 24 project out of the bearing tube 20, and the base ends of the left and right crankarms 26 and 28 are fixed to the respective shaft ends of the crankshaft 24 with a rotational phase difference of 180 degrees. The crankshaft 24 forms the rotational center of the crankarms 26 and 28, and the rotational center axis of the crankshaft 24 and the rotational center axis of the crankarms 26 and 28 coincide with each other.

A pedal 30 is attached to the free end of each of the crankarms 26, 28. A drive sprocket 32 (chain wheel) is positioned between the crankarm 28 on the right side and the bearing tube 20. The drive sprocket 32 is coaxially connected (fixed) to the crankshaft 24.

The crankshaft 24 can be rotationally driven by the left and right crankarms 26 and 28. The rotation of the crankshaft 24 is transmitted to the drive sprocket 32, and is transmitted from the drive sprocket 32 to the rear wheel (not shown) by a chain transmission mechanism (not shown). As a result, the electric power assisted bicycle 10 travels forward. A one-way clutch (not shown) is provided between the chain transmission mechanism and the rear wheel, and the rear wheel inertially rotate when the pedaling force is not put on the pedal 30 and the crankshaft 24 does not rotate. The above described configuration is one of a typical structure of a bicycle 10.

The bicycle 10 is provided with a unitized and retrofittable electric power assist device (electric power assist unit) 50. In the following description, the various directions such as up/down, front/rear, and right/left are based on the state where the electric power assist device 50 is attached to the frame structure 18 of the electric power assisted bicycle 10 as shown in FIGS. 1 and 2.

The electric power assist device 50 is provided with a housing 52 having a hollow structure. The housing 52 includes a ring portion 54 and a tongue shaped extension portion 56 extending radially outward from the ring portion 54. An electric motor 58 for generating an assist force is attached to the right surface of the extension portion 56. One end of the electric motor 58 is fixed to the extension portion 56 so that the rotational axis of the rotor output shaft (not shown) is directed in the lateral direction.

As shown in FIG. 3, the ring portion 54 includes a cylindrical portion 62 centrally defining a central opening 60 that is open in the lateral direction, The cylindrical portion 62 rotatably supports an annular rotational output member 64 on the outer periphery thereof. The cylindrical portion 62, together with the rotational output member 64, is disposed between the frame structure 18 and the crankarm 26 in a coaxial relationship with the crankshaft 24 while the crankshaft 24 extends laterally through the central opening 60 in a loosely received state. The rotational output member 64 is connected to the electric motor 58 in a torque transmitting relationship via a gear train (not shown) provided in the housing 52, and is thereby rotationally driven by the electric motor 58 in a coaxial relationship with the crankshaft 24.

The cylindrical portion 62 and the rotational output member 64 are installed between the frame structure 18 and the crankarm 26 by the following procedure. First, the left pedal 30 which is on the side not fitted with the drive sprocket 32 is removed by using a common tool such as a spanner. Next, with the electric power assist device 50 tilted sideways (the posture in which the electric motor 58 faces upward), the free end side of the left crankarm 26 is inserted into the central opening 60, and with the crankarm 26 passed into the central opening 60, the electric power assist device 50 is moved toward the base end side (rotational center side) of the crankarm 26 along the extending direction of the crankarm 26.

As a result, the crankarm 26 is passed through the cylindrical portion 62 and the rotational output member 64 until the cylindrical portion 62 and the rotational output member 64 are positioned near the base end of the crankarm 26. In other words, the inner diameter of the central opening 60 is dimensioned so that the crankarm 26 may be passed through the central opening 60.

If the central opening 60 has a large enough inner diameter to allow the pedal 30 attached to a crankarm 26 to be passed through, the assembly work can be performed without requiring the pedal 30 to be removed.

Next, the electric power assist device 50 is oriented to the normal posture (the posture shown in FIG. 2) in which the electric motor 58 faces sideways, and the crankshaft 24 is loosely passed into the central opening 60 in the axial direction. As a result, the cylindrical portion 62 and the rotational output member 64 can be positioned between the frame structure 18 and the crankarm 26 with the crankshaft 24 extending laterally and loosely received in the central opening 60 simply by removing the pedal 30 or without even requiring the pedal 30 to be removed.

The rotational output member 64 is connected to the crankshaft 24 and the crankarm 26 by a connecting mechanism 70. The connecting mechanism 70 includes a connecting main member 72 and two clamp piece members 74. A crankshaft fitting hole 26A is defined at the base end of the crankarm 26. A crank connecting member 78 is fitted in the crankshaft fitting hole 26A.

The connecting main member 72 has a substantially circular disk shape, and is fixed to the rotational output member 64 at the peripheral edge thereof by a plurality of bolts 75 and to the crank connecting member 78 at the central part thereof by a bolt 76. As a result, the rotational output member 64 is coaxially positioned relative to the crankshaft 24 via the connecting main member 72 and the crankarm 26.

The two clamp piece members 74, each having a wedge shape, are positioned on either side of the base end part of the crankarm 26 with respect to the rotational direction thereof, such that each clamp piece member 74 is in contact with an angled edge 73 of a corresponding connecting main member 72. A bolt 80 is provided for each clamp piece member 74, and as the bolts 80 are tightened to connect the clamp piece members 74 to the connecting main member 72, the clamp piece members 74 are caused to slide toward each other guided by the angled edges with interposing the crankarm 26 from both sides with respect to the rotational direction, so that the crankarm 26 and the connecting main member 72 are connected to each other in a torque transmitting relationship.

As a result, the rotational output member 64 is coaxially connected to the crankshaft 24 in a torque transmitting relationship, via the connecting main member 72 and the crankarm 26, and thus the rotational output member 64 and the connecting main member 72 can rotate together with the crankshaft 24. The rotational output member 64 and the connecting main member 72 are collectively referred to as a rotating member.

The clamp piece members 74 define bolt through-holes 81, through which the bolts 80 are passed. The bolt through-holes 81 are each formed in an oval shape so that, as the bolts 80 are tightened to connect the clamp piece members 74 to the connecting main member 72, the clamp piece members 74 can slide toward each other.

The extension portion 56 of the housing 52 is positioned under the down tube 14 while supporting the electric motor 58. The extension portion 56 is supported by and suspended from the down tube 14 via a support mechanism 90.

The support mechanism 90 includes a frame-side mount member 92. The frame-side mount member 92 includes a support base member 98 fixed to the down tube 14 by a fastening band 94 and provided with a rectangular frame structure part 96 in a lower part thereof, and a support member 104, the support member 104 having a rectangular plate-shaped part 100 fitted into the rectangular frame structure part 96 and fixed to the support base member 98, and a depending piece 102 depending downward from the rectangular plate-shaped part 100 and extending in the fore and aft direction.

The depending piece 102 is a cantilever piece, and defines a through-hole 103 which extends in the axial direction of the crankshaft 24 (or in the lateral direction) and is provided with an annular shoulder. A cylindrical fixed-side bush 106 is fitted in the through-hole 103 of the depending piece 102 in a rotationally fast manner A female screw 108 is formed on the inner circumferential surface of the large diameter portion 106B. A male screw 109 formed on the outer circumferential surface of a movable-side bush 110 is threaded with the female screw 108 so that the movable-side bush 110 can be threaded into and out of the large diameter portion 106B in the axial direction of the crankshaft 24, or in the lateral direction.

The movable-side bush 110 is provided with a flange part 112 on the side remote from the fixed-side bush 106. The flange part 112 is provided with an uneven shape similar to flower petals so that the movable-side bush 110 can be turned by hand. The flange surface of the flange part 112 is in direct contact with the laterally inwardly facing end surface of a boss part (connecting part) 66 formed on an upper part of the extension portion 56 of the housing 52.

The frame-side mount member 92 fixedly supports the housing 52 with a fastening bolt 114 which is centrally passed through the fixed-side bush 106 and the movable-side bush 110 in the axial direction of the crankshaft 24, and threaded into a screw hole 68 (not shown) of the boss part 66.

In this way, the fixed-side bush 106 and the movable-side bush 110 form a screw mechanism with the female screw 108 and the male screw 109 extending in the axial direction of the crankshaft 24 between the housing 52 and the frame structure 18, and the screw mechanism serves as an adjustment mechanism capable of adjusting (increasing or decreasing) the distance between the frame-side mount member 92 and the housing 52 along the axial direction of the crankshaft 24.

By suitably adjusting the distance along the axial direction, the tilting of the rotational output member 64 with respect to the central axis (crankshaft line) of the crankshaft 24 can be corrected, and the posture of the rotational output member 64 can be adjusted so that the rotational output member 64 extends along a plane orthogonal to the crankshaft axial line.

Triangular marks 116 and 118 (marks [1] to [3] 118) that are externally visible are printed on the outer surfaces of the extension portion 56 and the connecting main member 72 of the housing 52, respectively, and alignment of the marks indicates that the connecting main member 72, (i.e., the rotational output member 64 integrated with the connecting main member 72) is rotated to a predetermined rotational position with respect to the housing 52. As shown in FIG. 1, the mark 116 and the marks [1] to [3] 118 are aligned when the angle β formed by the straight line (unit center line) C and the straight line (crankarm line) E is 90 degrees, where the unit center line C passes through the rotation center point A of the crankshaft 24 (that of the rotational output member 64) and the rotation center point B of the electric motor 58, and the crankarm line E passes through the rotation center point A of the crankshaft 24 and the rotation center point D of the pedal 30. The marks [1] to [3] 118 are numbers on a dial and printed at equal intervals from each other in the direction of rotation of the connecting main member 72.

The mounting angle of the housing 52 with respect to the frame structure 18 determines the angle γ formed by the vertical line V along the direction of gravity and the unit center line C, which is detected based on an output signal of a gyro sensor 138 described later. When the mark 116 and the mark [1] of the marks 118 are aligned; that is, when the crankarm 26 is rotated to the rotational angle β, the angle α formed by the vertical line V and the crankarm line E is β−γ (i.e, α=90−γ), and a rotational angle sensor 134 is calibrated based on the angle α as described later by a calibrator 152 in a control unit 150.

The extension portion 56 of the housing 52 contains a control unit 150 (see FIG. 4) for electric power assist therein. A battery 122 consisting of a secondary battery that serves as a power source for the electric motor 58 and the control unit 150 is attached to the seat tube 12 by a fastening band (not shown) or any other fastening means.

Figure 4:
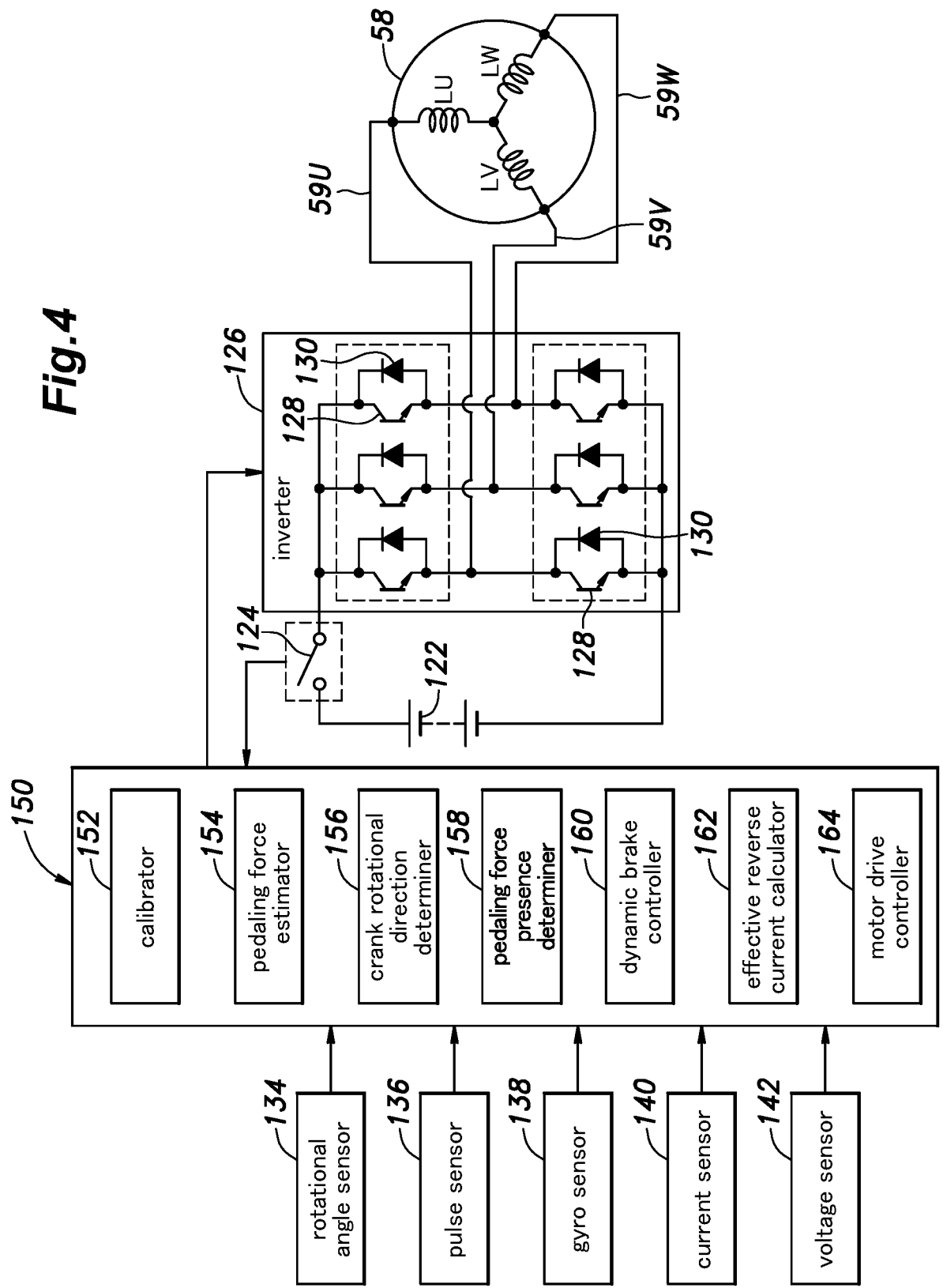
FIG. 4 is a block diagram of a power assist control system for the electric power assist device and a bicycle fitted with the electric power assist device of the first embodiment.

As shown in FIG. 4, the electric motor 58 is a three-phase AC motor having windings LU, LV, and LW of U-phase, V-phase, and W-phase, respectively, and electric current (electric power) is supplied from the battery 122 to each of the windings LU, LV, and LW via a power switch 124 and an inverter 126.

The inverter 126 serves as a power converter that is PWM-controlled by the control unit 150. In the inverter 126, for each phase (U phase, V phase, W phase), two sets of parallel circuits, each consisting of a power transistor 128 and a diode 130, are connected in series, so that the voltage applied to each phase of the electric motor 58 can be quantitatively adjusted by pulse width modulation.

When all the power transistors 128 of the respective phases are simultaneously in the ON state, allowing the windings LU, LV, and LW to be short-circuited to each other, the inverter 126 operates as a dynamic brake circuit. In other words, the inverter 126 serves both as a power converter and a dynamic brake circuit.

Next, the control system of the electric power assist device 50 will be described with reference to FIG. 4.

A rotational angle sensor 134, a pulse sensor 136, a gyro sensor 138, a current sensor 140, and a voltage sensor 142 are attached to the electric power assist device 50.

The rotational angle sensor 134 is provided on the electric motor 58 or the housing 52, and configured to detect the motor rotational angle or the rotational angle (absolute angle) of the rotational output member 64. When the housing 52 of the electric power assist device 50 is attached to the frame structure 18 of the bicycle 10 and the rotational output member 64 is connected to the crankshaft 24 by the connecting mechanism 70, the rotational angle sensor 134 detects the crank rotational angle (absolute angle) of the crankshaft 24.

Figure 5:
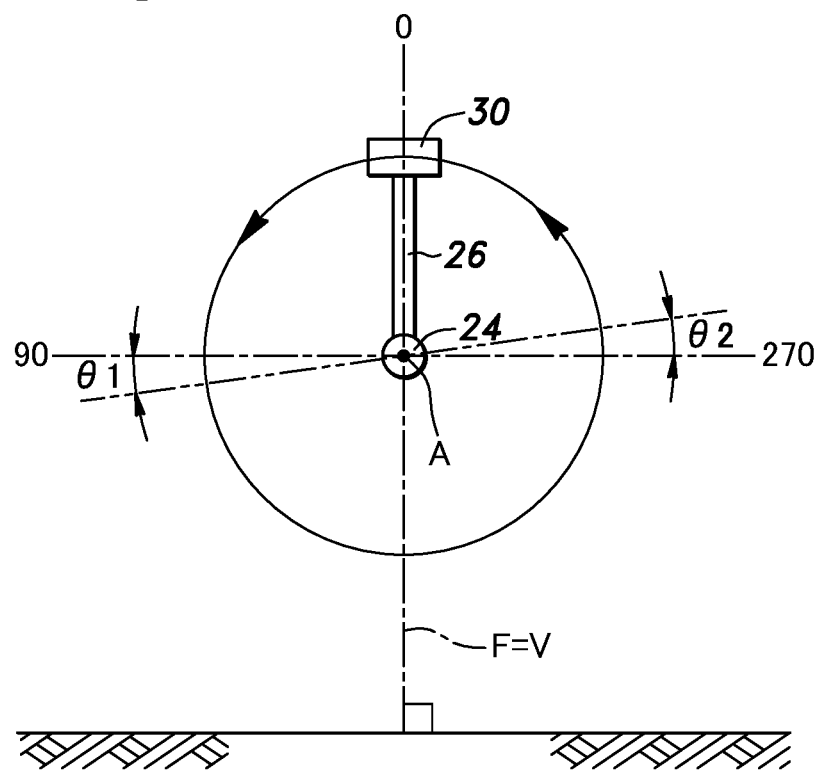
FIG. 5 is an explanatory view showing the relationship between the crank rotational angle and the position of the pedal of the bicycle.

As shown in FIG. 5, the zero point (origin) of the absolute angle that is detected by the rotational angle sensor 134 is set to the crank rotational angle of the crankshaft 24 when the pedal 30 of the crankarm 26 is located at the highest position.

In the following description, based on the premise that the electric power assist device 50 is attached to the frame structure 18 for the sake of simplicity, the rotational angle sensor 134 is sometimes described as being configured to detect the crank rotational angle of the crankshaft 24, which is equivalent to the motor rotational angle or the rotational angle of the rotational output member 64.

The pulse sensor 136 is provided in the housing 52 and detects the rotation of the crankshaft 24 and thus the rotational output member 64.

The gyro sensor 138 is provided in the housing 52 and detects the tilt angle of the rotational output member 64 (crankshaft 24). The gyro sensor 138 forms part of the tilt angle detector. Specifically, based on the output signal of the gyro sensor 138, the tilt angle detector detects the tilt angle of the electric power assist device 50 in the left-right direction and the fore and aft direction with respect to the direction of gravity; that is, the vertical line V.

The current sensor 140 detects the current values (motor current value (Im) and reverse current value (Idb)) of the connection lines 59U, 59V, 59W for the respective phases, each connection line connecting the electric motor 58 and the inverter 126. Although the current values may be detected for all three phases, the detection of the current values of at least two of the three phases is sufficient for controlling the electric power assist device.

The voltage sensor 142 detects the voltage of the battery 122.

The control unit 150 is an electronically controlled device including a microcomputer and other components. The control unit includes a calibrator 152, a pedaling force estimator 154, a crank rotational direction determiner 156, a pedaling force presence determiner 158, a dynamic brake controller 160, an effective reverse current calculator 162, a motor drive controller 164.

The calibrator 152 calibrates the rotational angle sensor 134, setting the reference absolute angle measured by the rotational angle sensor 134 on a flat ground based on the direction of gravity detected based on the output signal from the gyro sensor 138.

When the rotational angle sensor 134 is calibrated by setting the reference absolute angle of the rotational angle sensor 134 (detecting the origin angular position) based on the angle α calculated by α=90−γ, where γ is determined by the mounting angle of the housing 52 with respect to the frame structure 18 when the mark 116 and the mark [1] 118 are aligned; that is, when the rotational angle β of the crankarm 26 is 90 degrees.

A user can align the mark 116 with the mark [1] 118 by turning the crankarm 26 in the reverse direction, or turning the crankarm 26 with the rear wheel (not shown) of the bicycle 10 away from the road surface. When the mark 116 with the mark [1] 118 are aligned for a predetermined period of time, the calibrator 152 performs the calibration of the rotational angle sensor 134 as described above.

As a result, even when the mounting angle of the electric power assist device 50 with respect to the bicycle 10 varies, the electric power assist device can perform proper power assist control through the proper detection of the crank rotational angles (absolute angles).

For the details of the calibration of the rotational angle sensor 134, refer to the international patent publication (WO2020/217664A) of the Applicant's international patent application based on the Japanese Patent Application No. 2019-084258.

The pedaling force estimator 154 estimates the pedaling force of the bicycle 10 based on a value of effective reverse current (Ier) calculated by the effective reverse current calculator 162 described later. The pedaling force estimator 154 estimates the pedaling force to be greater with an increasing value of the reverse current (Ier). Specifically, the greater the value of the reverse current is, the greater the estimated pedaling force is, and the smaller the value of the reverse current is, the smaller the estimated pedaling force is. When the value of effective reverse current is a negative value, the pedaling force estimator 154 determines that the pedaling force is zero, thereby causing the electric motor 58 to stop operation.

When a value of reverse current (Idb) caused by a counter electromotive force, which occurs while the dynamic brake circuit is in an ON state as described later, is not stable, the pedaling force estimator 154 estimates the pedaling force of the bicycle 10 based on the values of motor current detected by the current sensor 140 at predetermined crank rotation angles, or the angular velocity or acceleration values calculated from the change in the crank rotation angle θ detected by the rotational angle sensor 134. For the details of the estimation of the pedaling force, refer to the international patent publication (WO2020/158280A) of the Applicant's international patent application based on the Japanese Patent Application No. 2019-052798.

The motor drive controller 164, which is configured to generate PWM signals, outputs a drive torque control command (PWM signal) to the inverter 126 so as to operate the electric motor 58 with an electric power according primarily to the pedaling force estimated by the pedaling force estimator 154.

Under a condition that the motor drive controller 164 provides PWM signals to the inverter, the inverter 126 serves as a power converter; that is, quantitatively sets the electric power to be supplied from the battery 122 to the electric motor 58. As a result, the electric motor 58 assists the pedaling with the drive torque according to the estimated value of the pedaling force.

The crank rotational direction determiner 156 determines whether the crankshaft 24 is rotating in a forward direction or in a reverse direction based on the crank rotational angles detected by the rotational angle sensor 134. When the crank rotational direction determiner 156 determines that the crankshaft 24 rotates in the reverse direction, the motor drive controller 164 performs control to cause the electric motor 58 to stop operating. This prevents unnecessary power assist from being applied when the crankshaft 24 rotates in the reverse direction.

The pedaling force presence determiner 158 determines whether or not a pedaling force is put on the pedal 30 from the rotational movement of the crankshaft 24 detected by the rotational angle sensor 134. When the pedaling force presence determiner 158 determines there is no pedaling force on the pedal, the motor drive controller 164 performs control to cause the electric motor 58 to stop operating. This prevents unnecessary power assist from being applied when there is no pedaling force on the pedal.

The motor drive controller 164 further performs correction control to increase or decrease the drive torque of the electric motor 58 according to the tilt angle with respect to the direction of gravity detected based on the output signal from the gyro sensor 138; that is, according to the tilts of the bicycle 10 in the left-right direction and the fore and aft direction with respect to the direction of gravity. This feature enables the power assist to be performed as needed by the rider, and improves the safety. For example, when the bicycle 10 is tilted to the left or right during turning, the motor drive controller decreases the assist force, and when the bicycle 10 is tilted in the fore and aft direction on an uphill road, the motor drive controller increases the assist force.

The motor drive controller 164 further performs control to reduce the rotational output of the electric motor 58 in response to the decrease in the battery voltage detected by the voltage sensor 142. This feature prevents over-discharging of the battery 122, thereby extending the life of the battery 122. This feature can also reduce the power consumption of the battery 122, thereby extending the power assist available distance (duration time) on one charge of the battery 122.

When the crank rotational angle detected by the rotational angle sensor 134 is within one or more predetermined crank rotational angle ranges, the dynamic brake controller 160 stops supply of current from the battery 122 to the electric motor 58 (blocking the motor current) and brings all the power transistors 128 of the respective phases in the inverter 126 to the ON state at the same time so that the inverter 126 can operate as a dynamic brake circuit. When the inverter operates in this dynamic brake state (when the dynamic brake circuit is in an ON state), the electric motor 58 is rotationally driven by a pedaling force to generate a corresponding counter electromotive force.

The counter electromotive force is rather small when the pedaling force is decreased because the blocking of motor current results in a significant reduction in the speed in that case. The counter electromotive force is large when the assist power is small and the pedaling force is increased because the blocking of motor current does not lead to a significant drop in the speed.

Figure 6:
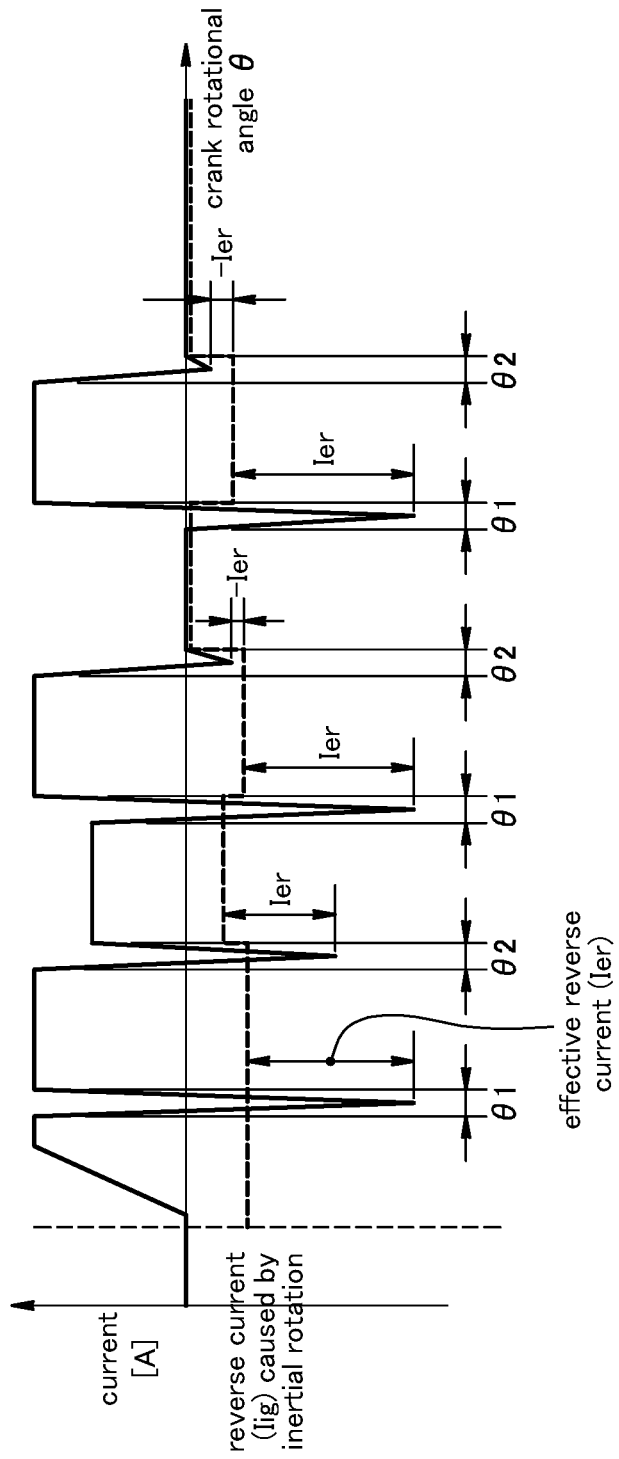
FIG. 6 is a graph showing the relationship between the crank rotational angle and the motor current in the bicycle

As shown in FIG. 5, the dynamic brake controller 160 brings the dynamic brake circuit to an ON state while blocking the motor current when the crank rotational angle of the crankshaft is within predetermined crank rotational angle ranges, where the predetermined crank rotational angle ranges include (i) a crank rotational angle range θ1 including a crank rotational angle of 90 degrees in the pedaling direction from a reference crank rotational angle (zero point), the reference crank rotational angle being a crank rotational angle when the pedal 30 of a crankarm on one side is located at its highest position, and (ii) a crank rotational angle range θ2 including a crank rotational angle of 270 degrees in the pedaling direction from the reference crank rotational angle. As a result, as shown in FIG. 6, a counter electromotive force occurs in each of the crank rotational angle range θ1 and the crank rotational angle range θ2 to generate a reverse current with reverse polarity from that of the motor current supplied from the battery 122. Each of the crank rotational angle ranges θ1 and θ2 may be between 2 degrees to 7 degrees, preferably about 5 degrees.

The effective reverse current calculator 162 receives a value of reverse current (Idb) caused by the above-described counter electromotive force from the current sensor 140, and calculates the value of reverse current (Iig) caused by inertial rotation (see FIG. 6) based on a motor reverse current i, a rotational speed of the electric motor (Nm) and a rotational speed of the crankshaft (Nc) by the following equation (1), and also calculates the value of effective reverse current (Ier) by subtracting the value of reverse current (Iig) from the value of reverse current (Idb) by the following equation (2).

$$Iig = \{Jm \cdot \alpha 1 \cdot Nm + (Jc + Jo)R2 \cdot \alpha 2 \cdot Nc + 10 \cdot Kt \cdot i\}/(10 \cdot V) \quad (1)$$

where
- Jm (kg/m²): moment of inertia of the electric motor 58,
- Jc (kg/m²): moment of inertia of the crank mechanism including the crankarms 26 and 28,
- Jo (kg/m²): moment of inertia of the rotational output part including the rotational output member 64,
- R: gear ratio of a gear train,
- Kt: torque constant for the electric motor 58,
- α1 (rad/sec²): motor angular acceleration,
- α2 (rad/sec²): crank angular acceleration,
- Nm (rpm): rotational speed of the electric motor,
- Nc (rpm): rotation speed of the crankshaft,
- i (A): value of motor residual current, and
- V (V): system voltage.

$$Ier = Idb - Iig \quad (2)$$

In this way, the value of effective reverse current (Ier) is calculated for each of the crank rotational angle range θ1 and the crank rotational angle range θ2; that is, for every half rotation of the crankshaft 24, as shown in FIG. 6.

The crank rotational angle range θ1 and the crank rotational angle range θ2 are crank rotational angle ranges in which the pedaling force put on each of the pedals 30 of the left and right sides is effectively used to drive the bicycle, the value of reverse current (Idb) caused by the counter electromotive force properly reflects the pedaling force. As a result, the value of effective reverse current (Ier) reflecting the pedaling force can be calculated for every half rotation of the crankshaft 24.

This configuration enables proper power assist control in response to a pedaling force without any complicated feature for detecting pedaling force and any necessary modification to the bicycle 10.

When the power switch 124 is turned off, the dynamic brake controller 160 brings the dynamic brake circuit to an always-ON state, and after the power switch 124 is turned on again and the crankshaft is manually rotated to preset crank rotational angles in a certain sequence, the dynamic brake controller 160 returns the dynamic brake circuit to a normal state in which the dynamic brake circuit is in the ON state only when the crank rotational angle is within the predetermined crank rotational angle range as described above.

In this configuration, the dynamic brake circuit is maintained in the always-ON state so that a pedaling force required to move the bicycle is sufficiently large to the extent that would not allow a rider to keep the bicycle moving and balanced, until the control unit 150 confirms, based on the output signal from the rotational angle sensor 134, that the connecting main member 72 is rotated to the preset crank rotational angles in the certain sequence, for example, the connecting main member 72 is rotated such that the respective marks 118 are sequentially aligned with the mark 116 such that the numbers of the aligned marks are in a sequence of [1]-[3]-[2] (dial adjustment operation).

When this sequence of numbers for dial adjustment is kept secret by the user, the configuration with these marks 116 and 118 serves as a dial-lock-type lock mechanism. Specifically, as the dynamic brake circuit is maintained in the always-ON state and thus a pedaling force required to move the bicycle is sufficiently large to the extent that would not allow a rider to keep the bicycle moving and balanced, this configuration provides an anti-theft feature.

This dial-lock-type anti-theft feature can be disabled by providing a mode setting command to the control unit 150. When the anti-theft feature is disabled, the dynamic brake circuit returns to a normal state in which the dynamic brake circuit is in the ON state only when the crank rotational angle is within the predetermined crank rotational angle ranges as described above.

Figure 7:
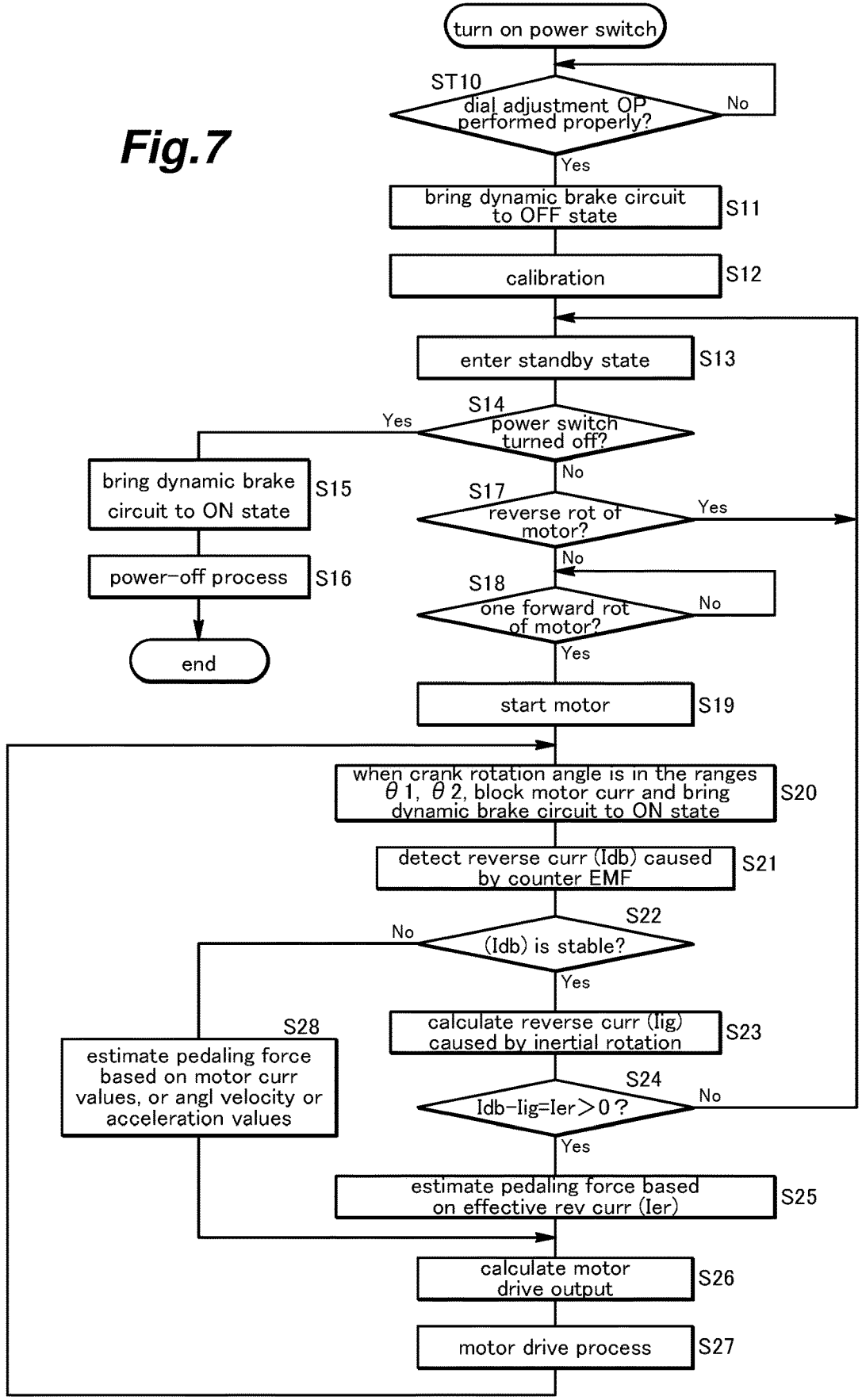
FIG. 7 is a flowchart of power assist control of the electric power assist device of the first embodiment.

Next, a power assist control routine executed by the control unit 150 will be described with reference to the flowchart shown in FIG. 7.

This control routine is started when the power switch 124 of the electric power assist device 50 is turned on. First, power is fed to each of the sensors 134, 136, 138, 140, and 142, and the control unit 150 confirms that the dial adjustment operation, in which marks 118 are sequentially aligned with the mark 116, is performed in a proper manner (step S10). The dynamic brake controller 160 maintains the dynamic brake circuit in the always-ON state, to which the dynamic brake circuit was brought when the power switch 124 was previously turned off, until the dial adjustment operation is properly performed. This control provides an anti-theft feature.

When the dial adjustment operation is properly performed, the dynamic brake controller 160 brings the dynamic brake circuit to an OFF state (step S11), and then the calibrator 152 performs the calibration of the rotational angle sensor 134 (step S12).

When the calibration is completed, the control unit 150 performs a standby state entry process, causing the electric power assist device 50 to enter a standby state (step S13). The standby state entry process involves stopping the electric motor 58.

Next, the control unit 150 determines whether or not the power switch 124 of the electric power assist device 50 is turned off (step S14). When the power switch 124 is turned off, the dynamic brake controller 160 brings the dynamic brake circuit to the always-ON state (step S15) and performs a power-off process (step S16). The power-off process involves stopping the power supply to each of the sensors 134, 136, 138, 140 and 142.

When the power switch 124 is not turned off, the crank rotational direction determiner 156 determines whether or not the electric motor 58 rotates in the reverse direction (step S17). When the electric motor 58 is rotating in the reverse direction, the control routine returns to the standby state entry process (step S13).

When the electric motor 58 is not rotating in the reverse direction, the control unit 150 confirms that the electric motor 58 has made one rotation (step S18), and then starts the electric motor 58 (step S19).

Next, when the crank rotational angle is within a predetermined ranges θ1 or θ2, the dynamic brake controller 160 stops supply of current to the electric motor 58 (blocking the motor current) and brings the dynamic brake circuit to the ON state (step S20). Under this condition that the motor current is blocked and the dynamic brake circuit is in the ON-state, a counter electromotive force occurs in the electric motor 58, and the current sensor 140 detects a value of reverse current (Idb) caused by the counter electromotive force (step S21).

Next, the control unit 150 determines whether or not the reverse current value (Idb) is stable (step S22). When the reverse current value (Idb) is stable, the effective reverse current calculator 162 calculates a value of reverse current (Iig) caused by inertial rotation (step S23).

Next, the control unit 150 determines whether or not the value of reverse current Idb−Iig is greater than zero (>0) (step S24). When the value of reverse current Idb−Iig is not greater than zero; that is, when the value of effective reverse current (Ier) is zero or a negative value, the control unit 150 determines that the vehicle is coasting, which requires no power assist, and the control routine returns to the standby state entry process (step S13).

When the value of reverse current Idb−Iig is greater than zero (>0), the pedaling force estimator 154 estimates the pedaling force of the bicycle 10 based on a value of effective reverse current (Ier) (step S25), and the control unit 150 calculates a motor drive output (PWM signal) based on the estimated pedaling force (step S26).

Next, the motor drive controller 164 performs a motor drive process based on the calculated motor drive output (step S27). The motor drive process involves energizing the electric motor 58 with electric power corresponding to the calculated motor drive output. As a result, the electric motor can assist the pedaling in response to the pedaling force.

In the step 22 of determining whether or not the reverse current value (Idb) is stable, when determining that the reverse current value (Idb) is not stable, the pedaling force estimator 154 estimates the pedaling force based on the values of motor current, or the angular velocity or angular acceleration values calculated from the change in the crank rotation angle θ (step S28), and the control unit 150 calculates a motor drive output (PWM signal) based on the estimated pedaling force. (step S26).

This configuration enables proper power assist control in response to a pedaling force without any complicated feature for detecting pedaling force and any necessary modification to the bicycle 10, and also enables the power assist to be performed as needed by the rider.

The present invention has been described in terms of specific embodiments, but is not limited by such embodiments, and can be modified in various ways without departing from the scope of the present invention. For example, in a second embodiment of the present invention shown in FIG. 8, instead of allowing the windings to be short-circuited to each other in the inverter 126, a dynamic brake circuit 170 including resistors Ru, Rv, and Rw may be used, wherein each of the resistors Ru, Rv, and Rw is connected to a corresponding phase of the electric motor 58 by a normally closed relay switch 172. The effective reverse current value (Ier) may be determined not by calculation, but by searching a data map including parameters such as remaining motor current value and rotational speed of the crankshaft. In addition, all of the components shown in the above-described embodiments are not necessarily essential for the present invention, but can be appropriately omitted and substituted as long as such omission and substitution do not deviate from the gist of the present invention.

GLOSSARY 10 bicycle
12 Seat tube
14: down tube
16 chain stay
18 frame structure
20 bearing tube
24 crankshaft
26 crankarm
26A crankshaft fitting hole
27 crankarm mounting screw
28 crankarm
30 pedal
32 drive sprocket
50 electric power assist device
52 housing
54 ring portion
56 extension portion
58 electric motor
60 central opening
62 cylindrical portion
64 rotational output member
66 boss part
70 connecting mechanism 72 connecting main member
73 angled edge
74 clamp piece member
75 bolt
76 bolt
78 crank connecting member
80 bolts
81 through-hole
90 support mechanism
92 mount member
94 fastening band
96 rectangular frame structure part
98 support base member
100 rectangular plate-shaped part
102 depending piece
103 through-hole
104 support member
106 fixed-side bush
106B large diameter portion
108 female screw
109 male screw
110 movable-side bush
112 flange part
114 fastening bolt
116 mark
118 mark
122 battery
124 power switch
126 inverter
128 power transistor
130 diode
134 rotational angle sensor
136 pulse sensor (rotation sensor)
138 gyro sensor
140 current sensor
142 voltage sensor
150 control unit
152 calibrator
154 pedaling force estimator
156 crank rotational direction determiner
158 pedaling force presence determiner
160 dynamic brake controller
162 effective reverse current calculator
164 motor drive controller
170 dynamic brake circuit
172 normally closed relay switch
LU winding
LV winding
LW winding
Ru resister
Rv resister
Rw resister

The invention claimed is:

1. An electric power-assist device for bicycles, the device comprising: a crankshaft configured to be driven by a force transmitted from a crankarm on each side, the crankarm having a pedal; an electric motor connected to the crankshaft or the crankarm of a bicycle in a torque transmitting relationship; a battery which is provided in the bicycle and serves as a power source for the electric motor; a housing which can be attached to a frame structure of the bicycle, wherein the electric motor is provided in the housing; a rotating member rotatably supported by the housing, rotationally driven by the electric motor, and connected to the crankshaft or the crankarm of the bicycle in a torque transmitting relationship; and a control unit for controlling operation of the electric motor,
wherein the electric power assist device further comprises:
a dynamic brake circuit connected to the electric motor;
a rotational angle sensor configured to detect a crank rotational angle of the crankshaft; and
a current sensor configured to detect a value of motor current supplied to the electric motor,
wherein the control unit comprises:
a dynamic brake controller configured to stop supply of current from the battery to the electric motor and bring the dynamic brake circuit to an ON state when the crank rotational angle is within one or more predetermined crank rotational angle ranges;
a pedaling force estimator configured to estimate a pedaling force put on each pedal of the bicycle based on a value of reverse current caused by a counter electromotive force and detected by the current sensor when the dynamic brake circuit is in the ON state; and
a motor drive controller configured to control the electric motor based on the pedaling force estimated by the pedaling force estimator.

2. The electric power assist device according to claim 1, wherein the pedaling force estimator estimates the pedaling force to be greater with an increasing value of reverse current.

3. The electric power assist device according to claim 1, wherein the pedaling force estimator determines the pedaling force based on a value of effective reverse current, the value of effective reverse current being calculated by subtracting a value of reverse current caused by inertial rotation of the crankshaft from the value of reverse current caused by the counter electromotive force, when the dynamic brake circuit is in the ON state.

4. The electric power assist device according to claim 3, wherein the motor drive controller causes the electric motor to stop operation when the value of effective reverse current is a negative value.

5. The electric power assist device according to claim 1, wherein the dynamic brake controller brings the dynamic brake circuit to the ON state when the crank rotational angle of the crankshaft is within the one or more predetermined crank rotational angle ranges, wherein the one or more predetermined crank rotational angle ranges include (i) a crank rotational angle range including a crank rotational angle of 90 degrees from a reference crank rotational angle, the reference crank rotational angle being a crank rotational angle when the pedal of one of the crankarms on one side is located at the highest position thereof, and/or (ii) a crank rotational angle range including a crank rotational angle of 270 degrees from the reference crank rotational angle.

6. The electric power assist device according to claim 5, wherein, when the electric power-assist device is power-off, the dynamic brake controller brings the dynamic brake circuit to an always-ON state, and, after the electric power-assist device is turned on again, the dynamic brake controller brings the dynamic brake circuit to the ON state only when the crank rotational angle is within the one or more predetermined crank rotational angle ranges.

7. The electric power assist device according to claim 5, wherein, when the electric power-assist device is power-off, the dynamic brake controller brings the dynamic brake circuit to an always-ON state, and, after the electric power-assist device is turned on again and the crankshaft is manually rotated to preset crank rotational angles in a certain sequence, the dynamic brake controller brings the dynamic brake circuit to the ON state only when the crank rotational angle is within the one or more predetermined crank rotational angle ranges.

8. The electric power assist device according to claim 1, further comprising a crank rotational direction determiner configured to determine whether the crankshaft is rotating in a forward direction or in a reverse direction based on crank rotational angles detected by the rotational angle sensor,
   wherein the motor drive controller causes the electric motor to stop operation when the rotational direction determiner determines that the crankshaft is rotating in the reverse direction.

9. The electric power assist device according to claim 1, further comprising:
   a rotational movement sensor configured to detect rotational movement of the crankshaft; and
   a pedaling force presence determiner configured to determine whether or not the pedaling force is put on each pedal from the rotational movement of the crankshaft detected by the rotational movement sensor,
   wherein the motor drive controller causes the electric motor to stop operation when the pedaling force presence determiner determines that no pedaling force is put on the pedals.

10. The electric power assist device according to claim 1, further comprising a gyro sensor for detecting a tilt angle of the bicycle with respect to a direction of gravity,
    wherein the motor drive controller corrects a rotational output of the electric motor based on the tilt angle detected by the gyro sensor.

11. The electric power assist device according to claim 1, further comprising a voltage sensor for detecting a voltage of the battery,
    wherein the motor drive controller reduces a rotational output of the electric motor in response to a voltage drop detected by the voltage sensor.

12. A bicycle fitted with the electric power assist device according to claim 1.

* * * * *